Aug. 25, 1942.  A. H. THOMPSON  2,294,057
LOCKING-NUT
Filed May 4, 1940
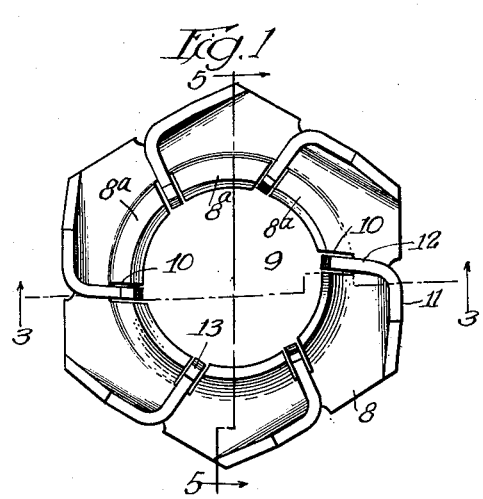
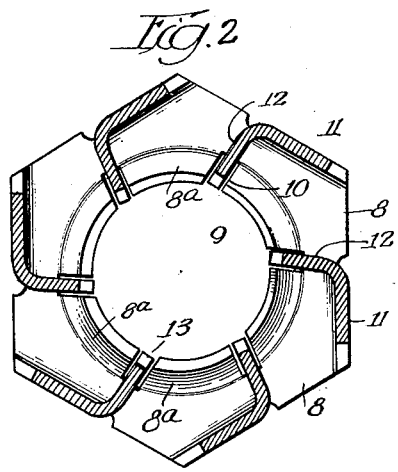
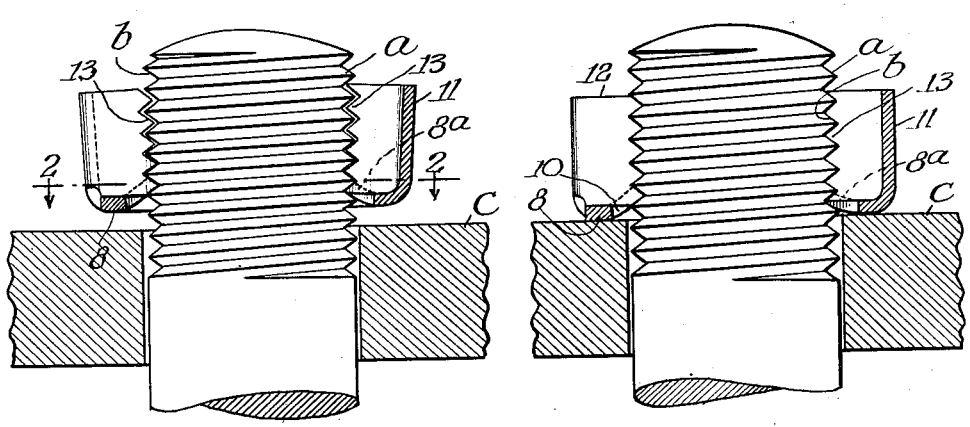
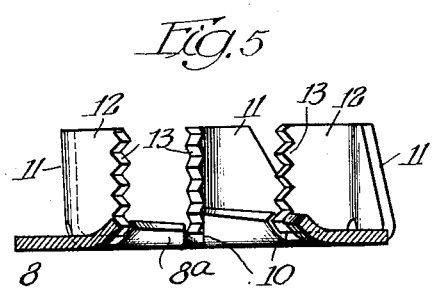
Inventor
Arthur H. Thompson
By Fred Gerlach
his Atty.

Patented Aug. 25, 1942

2,294,057

UNITED STATES PATENT OFFICE 2,294,057

LOCKING NUT

Arthur H. Thompson, Chicago, Ill., assignor to Thompson-Bremer & Co., Chicago, Ill., a corporation of Illinois Application May 4, 1940, Serial No. 333,296

4 Claims. (Cl. 151—14)

The present invention relates to lock nuts for use on screws.

The primary object of the invention is to provide a one-piece stamping formed lock-nut which will be efficiently locked to the screw by engagement with the work, can be economically fabricated, and is an improvement upon that which is disclosed in, and forms the subject matter of, an application for United States patent filed by me on April 6, 1940, Serial No. 328,199.

Other objects of the invention and the various advantages and characteristics of the present lock nut will be apparent from a consideration of the following detailed description.

The invention consists in the several novel features which are hereinafter set forth and are more particularly defined by claims at the conclusion hereof.

In the drawing: Fig. 1 is a plan view of a locknut embodying the invention. Fig. 2 is a section of the nut taken on line 2—2 of Fig. 3. Fig. 3 is a section taken on line 3—3 of Fig. 1, and showing the nut on, and freely rotatable around, a screw and before it has been brought into engagement with the work. Fig. 4 is a similar section showing the nut after it has been brought into firm engagement with the work and while it is firmly locked against reverse rotation on the screw. Fig. 5 is a section of the nut taken on line 5—5 of Fig. 1.

The invention is exemplified in a self-locking nut formed of a blank of flat sheet or plate metal of sufficiently heavy stock to function as a nut. The nut comprises a hexagonal base 8 which extends transversely of the axis of the screw a and serves as the body of the nut. The base is adapted to abut against the work c which may be any element through which the screw a extends or an ordinary nut. Said base is provided with a central hole 9 for the screw. The margin of the hole is provided with a series of notches 10 and the portions 8ª between the notches are helically bent or offset upwardly from the bottom face of the nut base to fit into one convolution of the V-shaped groove of the screw-thread b on the screw a. Each side of the hexagonal base 8 has an upstanding flange 11 extending substantially at right angles to the plane of the base and formed by bending the blank from which the nut is formed, upwardly from the base. Each flange 11 is provided, at one of its ends, with an upstanding tongue 12, which is formed by bending a strip of the stock or blank radially inward. Each tongue 12 is of substantially the same height as the upstanding flange 11 with which it is associated and is sufficient in height to lap a plurality of convolutions of the screw-thread b on the screw a. The inner end of each tongue 12 is provided with a plurality of V-shaped teeth 13 which extend longitudinally or axially of the screw and are shaped to conform substantially to the V-shaped cross-section of the groove of the thread b and are preferably sufficient in number for engagement with a sufficient number of the convolutions of the groove in thread b for effectively gripping the screw when radial inward pressure is applied to the tongues. The teeth 13 on the inner ends of tongues 12 are normally spaced away slightly from the screw to provide sufficient clearance between the teeth and the screw and to avoid pressure engagement with the screw-thread, so that the nut may be freely turned on the screw in either direction or without a wrench, as illustrated in Fig. 2.

In practice, it has been found to be objectionable to provide resilient tongues which are normally pressed against or scrape the thread while the nut is turned on the screw. In the use of screws which are plated or provided with an ornamental finish, scraping destroys the plating or finish. It is also advantageous to avoid pressure engagement between the resilient tongues and the screw-thread so the nut can be freely turned on the screw until the nut meets the resistance of the work. For these reasons, the teeth 13 on tongues 12 are normally spaced so they will not bear against the inclined side-faces of the screw-thread when the nut is on a screw and before it engages the work, as shown in Fig. 3.

The outer marginal portion of the base is adapted to engage the work as shown in Fig. 4. Rotation of the nut after the base initially engages the work will flex the base axially so that the upstanding flanges, which are normally flared upwardly and outwardly, will be forced toward the axis of the screw. After the base engages the work and the rotation of the nut is continued, the inner ends of helical portions 8ª will be forced downwardly toward the work and effect this bending to force the flanges 11 inwardly. This will force the tongues 12 inwardly in a radial direction so the teeth 13 on their inner ends will be forced into the groove and into wedging or jamming relation with the side-faces of the screw-thread b. This will cause the nut to be securely locked against reverse rotation relatively to the screw. The lower edges of the tongues abut against the upper face of base 8 so the forces of the base will be transmitted directly to the tongues as well as through flanges 11. Preferably, the tongues 12 are slightly off the dead centers between their outer ends and the axis of the screw and in the direction opposite that in which the nut is rotated onto the screw to prevent them from being sprung across the dead center by extraordinary force applied in the direction in which the nut rotates off the screw. By having the tongues disposed in off or non-dead center relation the tongues, even though in contacting relation with the screw, do not prevent the nut from being turned tightly against the work. When the nut has been tightened against the work, as illustrated in Fig. 4, the teeth 13 will be jammed against the inclined side-faces of the several convolutions of the screw-thread and by forces directed longitudinally of the tongues and this will effectively lock the nut against rotation away from the work. In the event that removal of the nut from the screw is desired, this may be effected by a suitable tool or wrench, for spreading the tongues sufficiently to disengage the teeth 13 from the inclined faces of the screw-thread such, for example, as the wrench forming the subject matter of United States Patent No. 2,270,092 granted to me on January 13, 1942.

The notches 10 correspond in number to the number of the tongues 12 and the inner lower corner of each tongue extends into one of the notches 10. This provides an interfit between the inner lower corners of the tongues and the base 8 which will prevent excessive bending of the tongues between their inner and outer ends as the tongues are forced by the work into pressure engagement with the thread. The clearance between the sides of the tongues and the sides of the notches is slight and, as a result, when the base is rotated and the tongues pass into pressure engagement with the screw, the inner ends of the tongues will be positively rotated by engagement of the sides of the notches 10 with the inner ends of the tongues. This makes it possible to cause the tongues to be forced into pressure engagement by the bending of the base without using unusually heavy stock in the nut and also to extend the tongues nearly in a radial direction without likelihood of bending the tongues across their dead centers. It also makes it possible, in some instances, to dispense with reinforcing formations in the flanges, tongues and base.

This exemplifies a self-locking nut in which the upstanding tongues are forced into pressure engagement with the screw by the bending of the base 8 as it engages the work and the translation of the bending moments into radial forces applied to the tongues for pressure engagement between their inner ends and the screw and in which the inner ends of the tongues interfit with the base for obtaining the results described.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a lock nut for use with a screw, formed of a sheet metal stamping and comprising a plate with a central hole therein for the screw and a plurality of elongated tongues extending in an annular series around said hole and having their outer ends joined to the plate, and their side-faces extending substantially at right-angles to the plate, the tongues being provided at their inner ends with teeth helically arranged conformably to the spiral of the thread of the screw and adapted to fit between and engage the side-faces of the thread, the plate having a helical marginal part around the central hole extending in the direction of the tongues, interfitting with the thread of the screw and having notches therein for receiving the inner ends of the tongues, the tongues being laterally flexible and extending inwards in such direction that their teeth-equipped ends will slide on the side faces of the screw while the nut is being turned onto the screw and will bite into said faces when the nut is urged rotatively in the opposite direction, the portions of the plate that define the sides of the notches serving to limit lateral flexing of the tongues.

2. As a new article of manufacture, a lock nut for use with a screw, formed of a sheet metal stamping and comprising a plate with a central hole therein for the screw, a series of upstanding marginal flanges, and a plurality of elongated tongues extending inwardly from the flanges in an annular series around said hole and having the side-faces thereof extending substantially at right-angles to the plate, the tongues being provided at their inner ends with teeth helically arranged conformably to the spiral of the thread of the screw and adapted to fit between and engage the inclined side-faces of successive convolutions of the thread, the plate having a helical upstanding marginal part around the central hole interfitting with the thread of the screw and having notches therein for receiving the inner ends of the tongues, the tongues being laterally flexible and extending inwards in such direction that their teeth-equipped ends will slide on the side faces of the thread while the nut is being turned onto the screw and will bite into said faces when the nut is urged rotatively in the opposite direction, the portions of the plate that define the sides of the notches being arranged to limit lateral flexing of the tongues.

3. As a new article of manufacture, a lock nut for use with a screw, formed of a sheet metal stamping and comprising a plate with a central hole therein for the screw, and a plurality of elongated tongues adjacent one side of the plate extending in an annular series around said hole, having their outer ends joined to the outer marginal portion of the plate and their side faces extending substantially at right angles to the plate, and provided at their inner ends with V-shaped teeth helically arranged conformably to the spiral of the thread of the screw and shaped to fit between and engage the inclined side faces of the thread, the plate having a helical marginal part around the central hole extending in the direction of the tongues, interfitting with the thread of the screw and provided with notches for receiving the inner teeth equipped ends of the tongues, and also having on the other side thereof and outwards of the helical marginal part a fulcrum type work-engaging part spaced axially from said helical marginal part, and being adapted when rotated on the screw so that the work-engaging part thereof is brought into firm engagement with the work to flex axially in such manner that the tongues are moved inwards towards the screw into a position wherein the inner teeth equipped ends thereof are in jammed or contacting relation with the side faces of the thread, the tongues being laterally flexible and extending inwards in such direction that their teeth equipped ends, after being brought into engagement with the thread due to axial flexure of the plate, will slide on the side faces of the thread when the nut is turned further towards the work and will bite into said side faces when the nut is urged rotatively in the opposite direction, the portions of said plate that define the sides of the notches serving as abutments or shoulders for limiting or restricting lateral flexing of the tongues.

4. As a new article of manufacture, a lock nut for use with a screw, formed of a sheet metal stamping and comprising a polygonal plate provided with a central hole for receiving the screw, a series of upstanding flanges around the margin of the plate and a plurality of elongated tongues above the top face of the plate extending inwardly from the flanges in an annular series around said hole, having the side faces thereof extending substantially at right angles to the plate, and provided at their inner ends with V-shaped teeth normally free from the thread of the screw and helically arranged conformably to the spiral of the thread and adapted and shaped to fit between and engage the side faces of successive convolutions of the thread, the plate having a helical upstanding marginal part around the central hole interfitting with the thread of the screw and provided with notches for receiving the inner ends of the tongues, and also having on the bottom or under side thereof and outwardly of said helical marginal part a protruding work-engaging part, and being adapted when rotated on the screw so that said work-engaging part thereof is brought into firm engagement with the work to flex axially in such manner that the tongues move inwards towards the screw into a position wherein the inner teeth equipped ends thereof are jammed against the side faces of the thread, the tongues being laterally flexible and extending inwards in such direction that their teeth equipped ends, after being brought into engagement with the thread, will slide on the side faces of said thread when the nut is turned further toward the work and will bite into said faces when the nut is urged rotatively in the opposite direction, the portions of the plate that define the sides of the notches serving as abutments or shoulders for limiting lateral flexure of the tongues.

ARTHUR H. THOMPSON.